June 24, 1958  T. S. SPRAGUE ET AL  2,840,050
SYNTHESIS GAS REACTOR WITH FLUID COOLED
JACKET FOR THE REACTION CHAMBER
Filed Sept. 10, 1954  3 Sheets-Sheet 1

INVENTORS
THEODORE S. SPRAGUE
EARL E. SCHOESSOW
BY
*M. Holbrook*
ATTORNEY

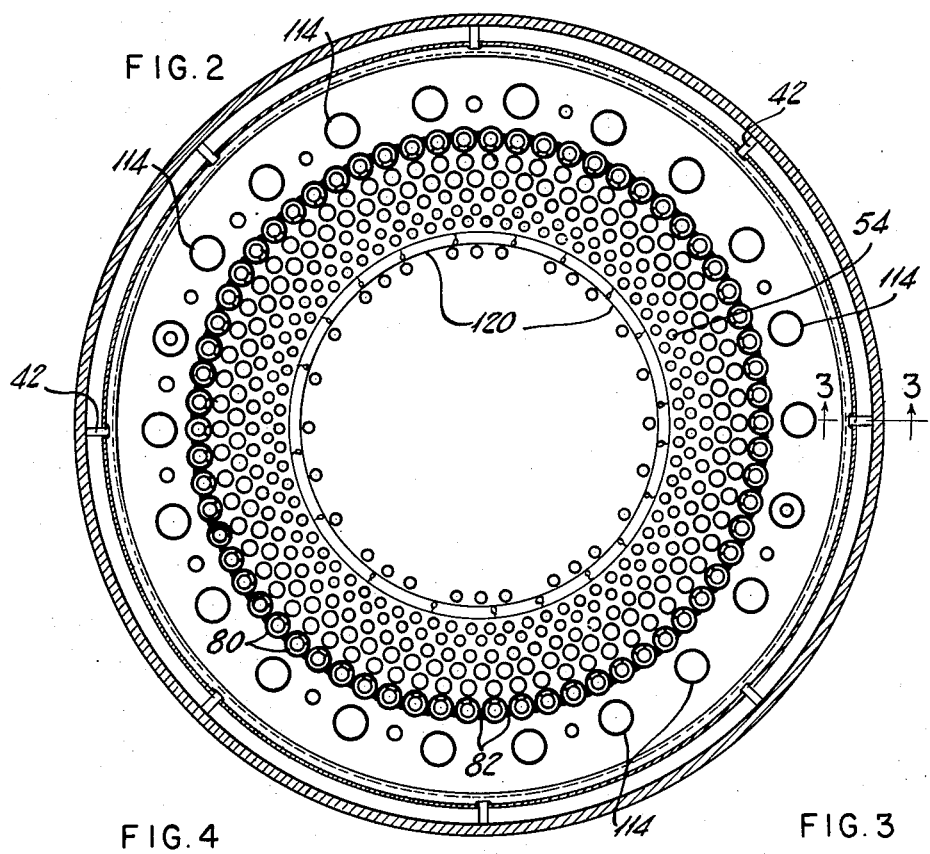
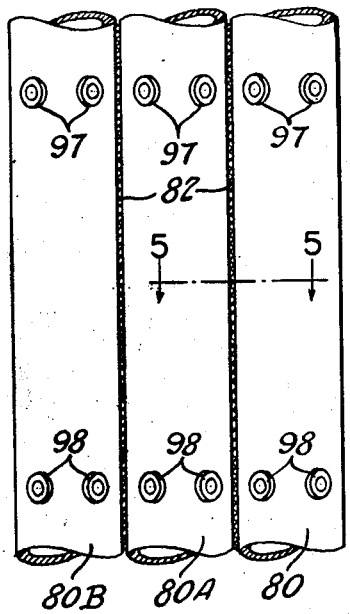
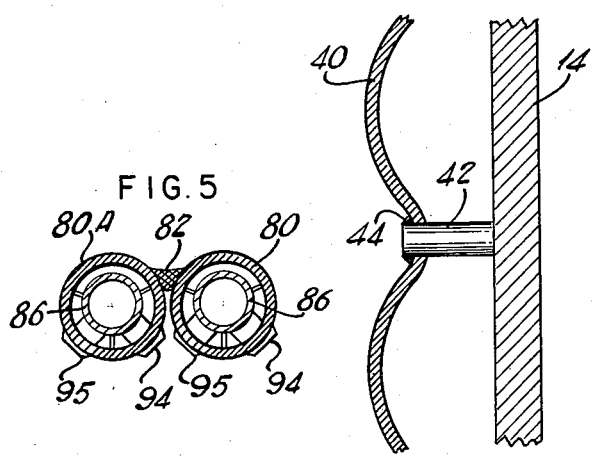

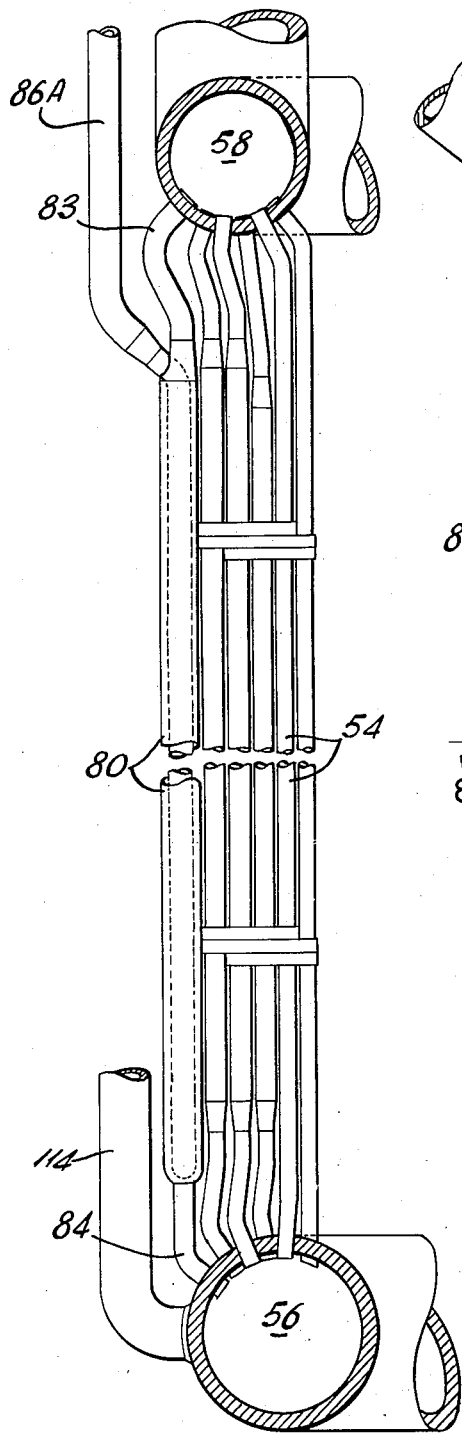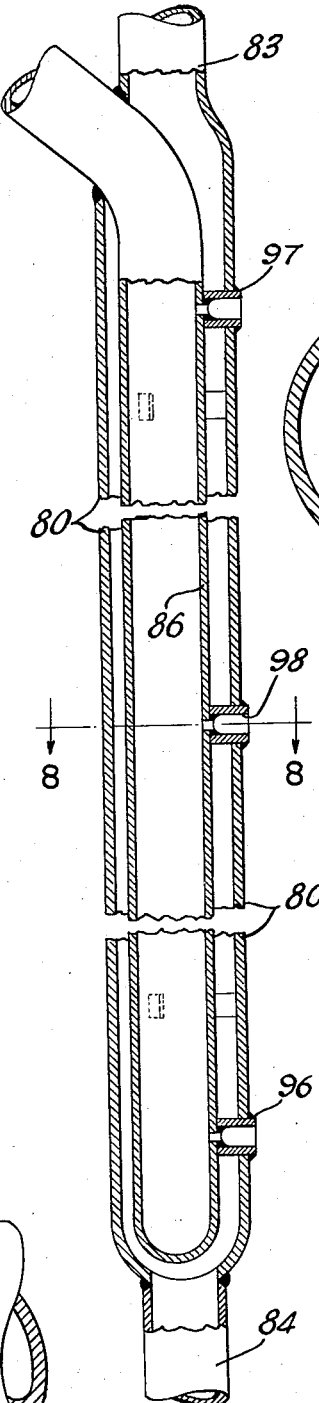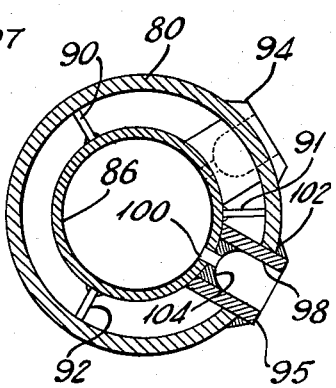

United States Patent Office 2,840,050
Patented June 24, 1958

2,840,050

SYNTHESIS GAS REACTOR WITH FLUID COOLED JACKET FOR THE REACTION CHAMBER

Theodore S. Sprague, Hewlett, N. Y., and Earl E. Schoessow, Barberton, Ohio, assignors to The Babcock & Wilcox Company, New York, N. Y., a corporation of New Jersey Application September 10, 1954, Serial No. 455,306

6 Claims. (Cl. 122—338)

The present invention relates to gas generation, and more particularly to the generation of synthesis gas for the catalytic synthesis of hydrocarbons, oxygenated hydrocarbons and mixtures thereof.

Generally, the invention relates to a unit in which there is high temperature generation of synthesis gas in a refractory lined reaction chamber. This gas generation takes place at high pressures and temperatures, and, as an example, it is effected by the controlled combustion of carbonaceous material such as coal, oil, or natural gas, with substantially pure oxygen in appropriate proportions for partial combustion. The gases resulting from this combustion reaction include high yields of hydrogen and carbon monoxide in essentially pure form. Because of the high pressure of the gases entering the reaction zone, the latter, as well as the remainder of the unit is included within a pressure vessel with the reaction zone or reaction chamber disposed toward one end of the pressure vessel where the reaction components such as methane and pure oxygen enter at substantial pressures. In the initial part of the reaction zone temperatures may theoretically be as high as 4000° F. Because of the high pressures of the gaseous elements in the reaction zone, and because of the high percentage of hydrogen in the reaction products, the latter have high specific heat and high thermal conductance. Because of all of the above indicated concurrent conditions in the reaction zone, this zone is protected by a chamber which has a high temperature refractory lining. Otherwise the high heat release and high temperatures within this zone would present difficult if not impossible problems of heat transfer.

It is important in the illustrative unit that its end result involves a high yield of hydrogen and carbon monoxide. This result is promoted in the cooling of the gas efflux from the reaction zone, at a rapid rate. This cooling takes place preferably in a cooling section of the unit which involves a convection heat exchanger. The cooling in this zone is carried below the range at which product reversion and undesired secondary reactions occur. It is also carried to a temperature level of the order of 600 to 650° F. which is suitable for charging directly to a subsequent hydrocarbon synthesis reaction to form the desired final hydrocarbon products in the overall equipment of which the illustrative unit is a part.

In the cooling section of the illustrative unit the partial combustion products from the reaction chamber pass across a multiplicity of longitudinally extending tubes containing water or other coolant, the combustion products thereby transferring their heat energy by indirect heat exchange to the coolant, and generating steam or other high pressure vapor.

In the illustrative apparatus the tubes of the heat exchanger are arranged in an upright gas pass of circular cross section. These upright tubes communicate at their lower ends, and at a position near the outlet of the reaction chamber, with a ring header, and their upper ends are connected to a similar ring header at an upper part of the cooling section. The inner wall of the annular gas pass is provided by a hollow core or basket formed by the helical tubes of a plurality of parallel forced flow circuits having water or other coolant pumped therethrough. The external wall of the annular gas pass is preferably formed by a ring of large diameter vapor generating tubes, each tube having disposed concentrically therein a tube for conducting a soot blowing fluid under suitable temperature and pressure conditions for the supply of soot blowing fluid to jets which extend through the walls of the outer tubes and are directed toward the ring of heat exchange tubes disposed within the annular gas pass. The tubes of this ring of outer tubes are preferably welded together throughout the length of the gas pass and within the annular zone outside of this ring of large diameter tubes and between that ring and the pressure vessel there is an annular space in which large diameter downcomers are disposed. These downcomers are connected at their lower ends to the lower ring header which is disposed adjacent the exit of the reaction zone.

Because of the heat transfer and gaseous conditions within the unit it is important that the heat transfer elements of the cooling sections of the unit be readily removable and replaceable for the purposes of repair and normal maintenance. To this end the upper part of the unit consists of a plurality of separable sections. The uppermost of these sections is a dome for the unit, and between the dome and the main section of the unit or pressure vessel there is an intermediate pressure vessel section normally detachably joined to the dome and the lower section in pressure-tight relationship. This intermediate section has provisions whereby it carries or supports all of the fluid conducting elements for the gas cooling section. Such elements include large diameter tubes communicating at their lower ends with the upper ring header and extending to an elevated position within the intermediate section of the casing. At this position they are bent outwardly so as to extend through the casing. They preferably lead to an external vapor and liquid separating drum in which the liquid of the mixtures discharging from the heat exchange elements of the cooling section is separated and is returned to the lower ring header by the downcomers. These downcomers also extend through the wall of the intermediate casing section and are supported thereby. Also extending through the wall of the intermediate section of the casing are tubular connections for the forced circulation of fluid to the coils of tubes constituting the core or basket forming the inner wall of the annular gas pass. All other connections for the fluid conducting elements of the cooling sections also pass through the wall of this intermediate section.

Throughout the major part of the vertical extent of the pertinent pressure vessel and extending over the height of the reaction chamber and the predominant part of the height of the fluid heat exchange tubes constituting parts of the gas cooling section of the unit, thermal protection for the wall of the pressure vessel is afforded by an annular body of liquid maintained within a liquid reservoir or jacket formed as an annular chamber between the pressure vessel wall and an inner corrugated plate metal lining, this annular chamber being supplied with a cooling liquid, with the upper part of the annular chamber open to the gas space at the upper part of the unit whereby there is pressure equalization between the liquid chamber and in the pertinent gas space. Thus any vapor generated from a vaporizable liquid when the latter is used as a cooling fluid within the liquid reservoir passes freely to the upper part of the gas space and out of the unit without interfering in any way with the gases in or near the zone of the reaction chamber.

This invention also covers the extension of the thermal protection of the pressure vessel shell above the corrugated liner jacket by a metallic wall which not only prevents the high temperature gases from contacting the lower temperature pressure vessel shell to a level near the level of the dome, but it also provides thermal protection for the tubular connections between the fluid heat exchange components within the pressure vessel and positions exteriorly of the pressure vessel. This metallic wall for the pertinent thermal protection purposes forms a casing arranged, to a great extent, internally of the intermediate section of the pressure vessel, and extends downwardly from a position near the top of that section to the position where the soot blower tubes are united to continue an annular wall downwardly toward the combustion or reaction chamber.

The invention as represented by features of the illustrative unit will be clearly and concisely set forth in the appended claims, but for a more complete understanding of the invention, its operation, its uses and advantages, recourse should be had to the following description which refers to the accompanying drawings in which a preferred embodiment of the pertinent unit is illustrated.

In the drawings:

Fig. 2 is a horizontal cross-section on the line 2—2 of Fig. 1;

Fig. 3 is a detail view on the line 3—3 of Fig. 2, showing the manner in which the corrugated pressure vessel liner is secured at spaced circumferential positions to the pressure vessel or casing;

Fig. 4 is a fragmentary elevation of the arrangement of large diameter soot blower tubes which form the outer wall of the annular gas pass;

Fig. 5 is a detailed view showing the manner in which the large diameter tubes of the Fig. 4 wall are related;

Fig. 6 is a detailed view showing sections of the upper and lower ring header and showing some of the header connecting fluid conducting tubes, including a large diameter soot blower tube and one of the downcomers disposed externally of the annular gas pass;

Fig. 7 is mainly a vertical sectional view showing the structure of one of the large diameter soot blower tubes; and Fig. 8 is a horizontal section of a soot blower tube taken on the section line 8—8 of Fig. 7.

Figure 1:
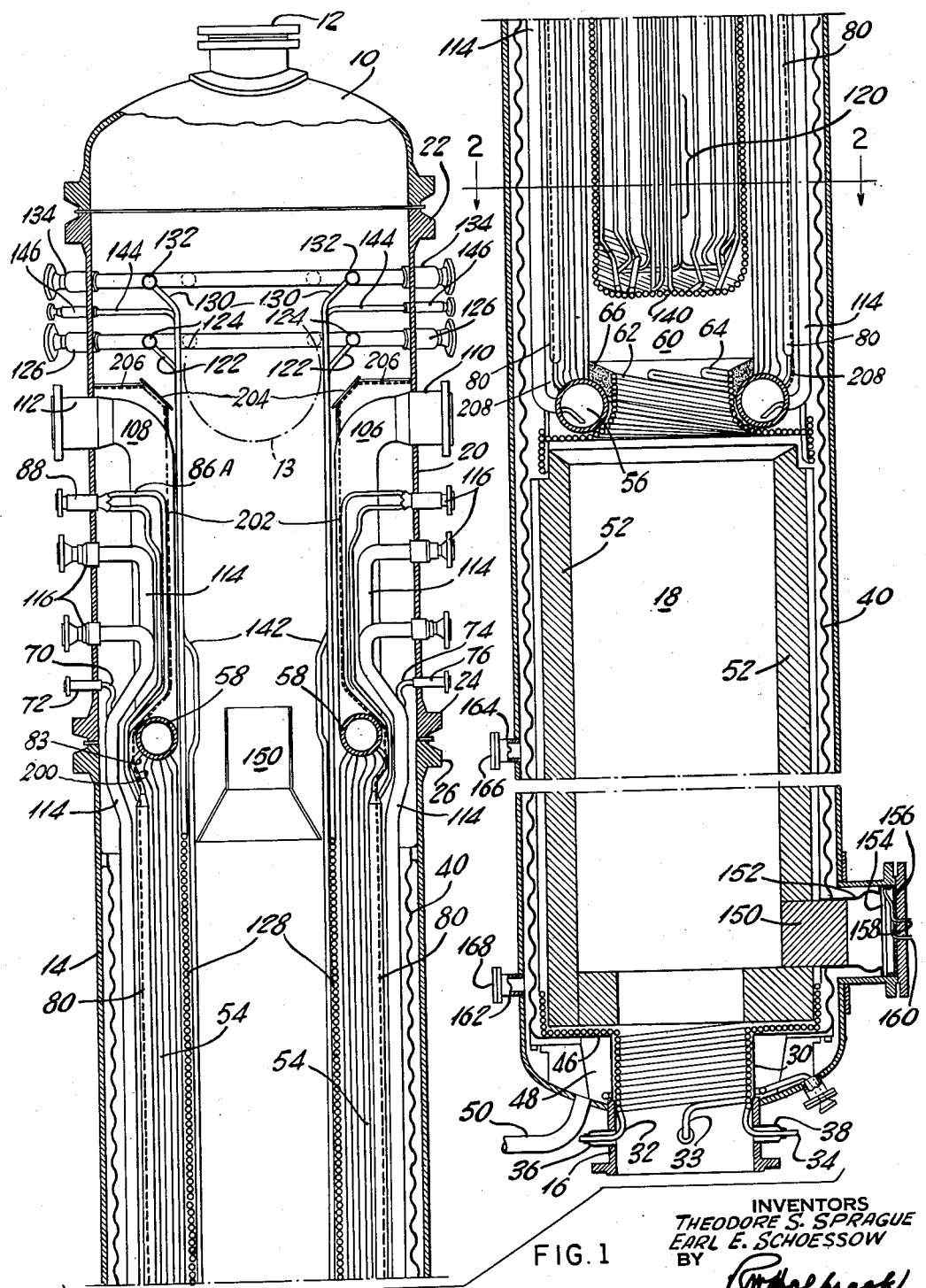
Fig. 1 is a two-part vertical longitudinal section through the illustrative unit with the right-hand part of this view showing the reaction chamber and its relation to the cooling section, within the pressure vessel, and the left-hand part of this view showing the upper part of the illustrative unit.

The illustrative unit, as indicated in Fig. 1 includes a pressure vessel which is divided into three parts to provide a sectional casing for the internals of the unit. The pressure vessel includes a top dome 10 having a manway 12. It also includes a main section or lower section 14 extending from its lower end where there is provided a large diameter nozzle 16 for the inlet of the gaseous reactants to the reaction chamber 18.

Between the lower pressure vessel section 14 and the dome 10 there is an intermediate section 20 separably joined at its upper end to the dome 10 and at its lower end to the lower pressure vessel section 14. For such separable junctures the sections of the pressure vessel include the thickened end flanges such as indicated at 22 and 24 at the ends of the intermediate pressure vessel section 20. Aligned with the thickened section 24 is a similar end section 26 at the upper end of the lower pressure vessel section 14. These thickened sections constitute flanges between the meeting faces of which there is positioned a gasket, a ring of bolts passing through the flanges to tighten the two sections of the pressure vessel together and compress the gasket between flanges such as 24 and 26. The dome 10 is secured in a similar manner in pressure tight relationship to the upper end of the intermediate section 20 of the pressure vessel. A gas outlet 13 projects laterally from the upper part of the vessel intermediate section 20.

Because of the high theoretical temperature of the initial reaction of methane and oxygen entering the inlet of the reaction chamber through the nozzle 16, this nozzle and its inner extension 30, as well as the lower part of the reaction chamber 18 is thermally protected by the cooling effect of a series of helical forced flow tube coils. These coils have helical portions lining the inner part of the nozzle extension 30 as indicated in Fig. 1 and have appropriate inlets 32—34 leading outwardly through the wall of the nozzle 16 to a suitable pump or pumps. At positions where these inlets pass through the wall of the nozzle 16 they are joined thereto by appropriate thermal sleeve connections 36 and 38. Such a thermal sleeve connection is illustrated by the patent to Rowand, 2,331,932, of October 19, 1943. The separate parallel coils having the inlets such as 32—34 have appropriate outlets preferably leading through the pressure vessel wall to the external steam and water drum (not shown). The inlet or inlets of the pump or pumps providing the forced circulation through the protective coils are in communication with an appropriate supply source.

The lower section 14 of the pressure vessel and its lower end are protected by an annular body of coolant extending from a position near the top of the lower section to a position adjacent the inlet 16 for the gaseous reactants. The annular reservoir or space for this body of coolant is provided by the interior surface of the pressure vessel section 14 and a corrugated metallic liner 40. This liner is concentric with reference to the casing section and is held in spaced relation thereto at distributed positions over the area of the liner by metallic studs 42 one of which is indicated particularly in Fig. 3. These studs preferably pass through openings in the liner and are welded to the liner as indicated at 44. At the bottom of the liner there is an annular plate 46 with its inner circumferential edge portion joined inwardly to the extension 30 of the nozzle 16 and its outer edge portion joined to the lower end of the liner to provide the additional reservoir space 48 at the bottom of the pressure vessel. Preferably the coolant reservoir between the liner and the pressure vessel casing section 14 is supplied with a vaporizable fluid through a conduit 50. The flow through this conduit is preferably controlled so as to maintain a level of the liquid within the reservoir beneath the top of the liner 40. The reservoir space is open at its top to the space through which the gases flow through the intermediate pressure vessel section 20 and thence to the gas outlet 13. The invention contemplates an optimum condition in which there is little if any vaporization of the liquid within the annular reservoir.

The use of a corrugated liner instead of a flat metal plate liner not only permits the use of metal of smaller gage but it also provides a degree of flexibility which is of advantage under the different temperature conditions which may exist at times on opposite sides of the liner.

The heat transfer rate from the high temperature gases within the reaction chamber 18 may be of the order of 250,000 B. t. u. per square foot of surface and this is of such a magnitude that a flat liner in place of the corrugated liner 40 would be over-stressed and possibly disrupted in the event of a break in the refractory wall 52.

The gas cooling section of the illustrative unit above the reaction chamber 18 includes a convection heat exchanger having a ring shaped bank of horizontally spaced upright tubes 54 arranged within an annular gas pass, the tubes communicating at their lower ends with a lower ring header 56, and at their upper ends with an upper ring header 58. The gaseous efflux from the reaction chamber 18 passes upwardly through the central opening provided by the ring header 56 and into the inlet chamber 60 which is in communication with the superposed annular gas pass. To prevent the over-heating of the metal of the header 56 by the high temperature gases passing through the opening of the ring header 56 the lower and inner surfaces of the header are shielded by one or more helical coils of tubes through which a coolant such as water is pumped. These coils are preferably arranged in parallel flow relationship leading from a pump or pumps and having their outlets connected to an external steam and water drum from the water space of which other conduits lead to the inlet or inlets of the pump or pumps. The coils, indicated by the numerals 62 and 64 are preferably arranged in tube to tube relationship so as to form a practically continuous wall interposed between the high temperature gases and the header 56. The contiguous tube sections are also preferably welded together throughout their shield lengths. As shown in Fig. 1 the upper end of this wall as formed by the forced circulation coils forms, with the inner and upper surfaces of the header 56 a groove or pocket in which there is disposed high temperature refractory material 66. To afford appropriate connections from the outlets of the coils such as 62 and 64 to suitable components of the heat exchanger system and to afford other similar connections to the inlets of the coils, the inlets may communicate with tubes such as 70, indicated at the upper left-hand part of Fig. 1 extending through the wall of the intermediate pressure vessel section 20 through the thermal sleeve 72 such as above referred to. The other ends of the coils are connected to other tubes such as 74 leading through the wall of the intermediate pressure vessel section 20 and through other thermal sleeves 76, it being understood that there may be a ring of tubes such as 70 and 74, dependent upon the number of coils such as 62 and 64.

The outer wall of the annular gas pass leading up from the inlet chamber 60 is provided by a row of large diameter soot blower tubes 80. These tubes are the outermost row of tubes which directly connect the upper ring header 58 with the lower ring header 56. These tubes are arranged in tube to tube relationship with the adjacent tubes contacting each other or arranged in closely spaced relation. They are preferably held in their tube to tube and wall forming relationship by line welds in the grooves therebetween externally of the wall formed by the tubes. Such a longitudinal weld is indicated at 82 in Figs. 4 and 5.

The wall formed by the outer tubes such as 80 and 80-A of the soot blower structures thus forms part of an upward extension of the thermal protection of the pressure vessel shell against the effects of contact of the shell by the flowing high temperature furnace gases. The upper part of this wall formed by the soot blower tubes and their connecting welds is continued upwardly to the ring header 58 by plates or a plate construction 200, preferably adjacent the swaged down ends 83 of the soot blower tubes. This upward extension of the thermal protection of the shell is continued above the ring header 58 by an annular or hollow cylindrical shell 202 as indicated by dot-and-dash lines in the left hand part of Fig. 1. It may be secured to the tubular connections 106 and 108, and it continues above the tops of these connections where the annular space between this casing and the intermediate section 20 of the pressure vessel is closed by annular plates 204 and 206.

The above indicated casing is continued from the lower ends of the outer tubes 80 of the soot blower constructions to the lower ring header 56 by plates or an annular plate construction 208.

The structure and arrangement of the soot blower tubes 80 is indicated specifically in Figs. 6, 7 and 8.

Figs. 6 and 7 of the drawings indicate the specific structure of each one of the soot blower tubes 80. As here indicated the upper end of each tube 80 is swaged down to a smaller diameter to present its outlet section 83, connected directly to the upper ring header 58. The lower end of each soot blower tube has welded thereto an inlet section 84 of smaller diameter, as particularly indicated in Fig. 7.

Disposed within the main section of each soot blower tube 80 is a tube 86 of smaller diameter leading through the juncture of the inlet section 83 and the main section of the tube. This inner tube 86 is supplied with a soot blowing fluid through the conduit 86A which is united with a similar conduit at the position of the thermal sleeve 88 where the soot blowing fluid is conducted through the wall of the intermediate pressure vessel section 20. Externally of the unit these soot blower tubes are connected to a suitable source of a soot blowing fluid of effective temperature and pressure. The inner tube 86 is held in concentric relation to the outer tube 80 as indicated in Fig. 8. This figure discloses a series of spacers or studs 90–92 preferably welded at their inner ends or margins to the inner tube 86. The interior of each of the tubes 86 is in communication with a series of soot blower jet structures such as 94–97 distributed over the face or side of the soot blower tube facing the tubes 54. Each soot blower jet structure includes a short tubular element 98 extending through an opening in the wall of the tube 80 and communicating through the orifice 100 with the interior of the tube 86. The outer end of the tubular element 98 is preferably welded to the exterior of the tube 80 as indicated in 102, and the inner end of this element is united with the inner tube by the weld 104 which may be drilled after the deposit of the weld metal to form the orifice or bore 100.

The headers 56 and 58 and their connected tubes and associated structure are pendently supported by upright large diameter conduits such as 106 and 108 extending to positions in the upper part of the intermediate pressure vessel section and then extending outwardly through its wall as indicated at 110 and 112. These tubular elements may be considered as steam risers which conduct the steam and water mixtures from the upper header 58 to a steam and water separating drum or other separating apparatus disposed externally of the unit and preferably at an elevation above the elevation of the tops of the conduits 106 and 108. The liquid separated from such mixtures in the external separator is conducted to the lower ring header 56 by the downcomers 114. There is a ring of these downcomers disposed in the annular space between the annular gas pass and the pressure vessel wall, as clearly indicated in Figs. 1 and 2 of the drawings. These downcomers are secured to the intermediate section 20 of the pressure vessel as indicated at 116 and are supported by this section of the pressure vessel at these positions.

The inner wall of the annular gas pass above the inlet chamber 60 is formed by a hollow cylindrical core or basket structure pendently supported from the intermediate section 20 of the pressure vessel by coil inlet tubes 122 leading downwardly as shown in the upper part of Fig. 1 from larger diameter conduits 124 which are secured to the wall of the intermediate pressure vessel section 20 by the thermal sleeve structures 126. The tubes 122 leads downwardly to the basket 120 which is formed by a plurality of helical coils formed in turn, by continuations of the inlet tubes 122. The position of these helical coils is indicated at 128. The outlets of these coils are connected to upright pipes 130 which lead to the larger diameter conduits 132 secured to the pressure vessel section 20 by the thermal sleeve structures 134.

The lower end of the basket or internal core structure 120 is completed by the coils 140 of tubes which are disposed in convoluted or spiral arrangement at the bottom of the basket. The inlets of these coils are connected to upwardly extending tubes 142 which continue to the radial extensions 144 which, in turn, are supported by the pressure vessel section 20 through the intermediacy of the thermal sleeves 146. Thus the entire core or basket structure 120 is supported from the pressure vessel section 20 so that it may be removed along with that section and along with the other tubes of the convection heating unit of the cooling section when the pressure vessel section 20 is detached from the lower section and moved upwardly. The coil tubes forming the side walls and the lower end wall of the core or basket structure 120 may be maintained in their wall forming and continuous relationship by welding adjacent tubes together so that the entire structure constitutes an integral body. These welds are preferably continuous throughout the wall forming parts of the coil tubes.

Disposed internally with respect to the core or basket structure 120 and near the top thereof is an inverted funnel structure 150, the purpose of which is to provide for pressure equalization within the core or basket structure and the gas pass or gas outlet above the annular bank of tubes connecting the upper and lower headers 56 and 58.

At the right-hand lower part of Fig. 1 there is indicated a manway or access structure including a body 150 of high temperature refractory removably disposed within an opening in the wall of the refractory lining 52 for the reaction chamber 18. The outer end of this refractory body is disposed within a sleeve or conduit part 152 which projects through an opening in the liner 40 and is preferably welded thereto for pressure tightness. The outer end of this element 152 is closed by a plate 154 normally secured thereto in pressure tight relationship in any suitable manner. The outer surface of this plate is protected from the high temperatures of the reaction zone by a forced circulation cooling coil 156 having an inlet 158 and an outlet 160.

Inspection of the liner 40 may take place through inspection openings provided by the tubular elements 162 and 164 which are welded to the pressure vessel as clearly indicated in Fig. 1. The flanged outer end of these tubular elements are normally closed in pressure tight relationship by the covers 166 and 168.

Whereas the invention, in conformance with the statutes has been clearly described with reference to the details of a preferred embodiment thereof it is to be appreciated that the invention is not necessarily limited to all of the details of that embodiment. The invention is, rather, to be taken as of a scope commensurate with the scope of the subjoined claims.

What is claimed is:

1. In a heat exchange unit, a vertically elongated upright pressure vessel, means forming a refractory lined gaseous reaction chamber in the lower part of the pressure vessel, a substantially imperforate corrugated plate metal liner spaced inwardly of the pressure vessel wall and secured thereto in the zone of the reaction chamber and providing a liquid jacket around the reaction chamber, a gas outlet at the upper part of the pressure vessel, and convection heat exchanger disposed between the reaction chamber and said outlet; the heat exchanger including means providing an upright gas pass, upright fluid conducting tubes disposed within the gas pass, means directing the high temperature reaction gases over said tubes, and means through which the heat exchanger and said liquid jacket are supplied with fluid to be heated; said corrugated metal liner and the liquid jacket being so constructed and arranged that there is free communication between the gas flow space of the pressure vessel and the jacket at a level above the level of the top of the reaction chamber.

2. In a heat exchange unit, a vertically elongated upright pressure vessel, means forming a gaseous reaction chamber having a gas inlet through the pressure vessel wall, a substantially imperforate corrugated plate metal liner spaced inwardly of the pressure vessel wall and secured thereto in the zone of the reaction chamber and combining with said wall to provide a liquid jacket around the reaction chamber, means forming a gas outlet at the upper part of the pressure vessel, and a convection heat exchanger disposed between the reaction chamber and said outlet; the heat exchanger including means providing an upright gas pass, upright fluid conducting tubes disposed within the gas pass, lower header means communicating with the lower ends of the tubes, upper header means communicating with the upper ends of the tubes, and means through which the heat exchanger and said liquid jacket are supplied with fluid to be heated; the liquid jacket formed between the pressure vessel wall and the corrugated liner extending from a level adjacent the bottom of the reaction chamber to a level well above the reaction chamber, and means providing a pressure equalizing connection between the upper end of said jacket and the gas flow path above the convection heat exchanger.

3. In a heat exchange unit, a vertically elongated upright pressure vessel, means forming a refractory lined gaseous reaction chamber in the lower part of the pressure vessel, a substantially imperforate corrugated plate metal liner spaced inwardly of the pressure vessel wall and secured thereto in the zone of the reaction chamber and providing a liquid jacket around the reaction chamber, a gas outlet at the upper part of the pressure vessel, and convection heat exchanger disposed between the reaction chamber and said outlet, the heat exchanger including wall means providing an upright gas pass for upright fluid conducting tubes disposed within the gas pass, lower header means communicating with the lower ends of the tubes, upper header means communicating with the upper ends of the tubes, tubular means through which the heat exchanger and said liquid jacket are supplied with fluid to be heated; said tubular means extending through the pressure vessel wall above the heat exchanger, the liquid jacket formed between the pressure vessel wall and the corrugated plate metal liner extending from a level adjacent the bottom of the reaction chamber to a level well above the reaction chamber where the jacket (or its fluid space) is in communication with the gas space above the convection heat exchanger, and a generally hollow cylindrical wall disposed inwardly of the pressure vessel wall in the zone of said tubular connections and extending downwardly to junction with a part of said heat exchanger wall means to protect the pressure vessel wall against the high temperature gases from the reaction chamber.

4. Synthesis gas apparatus comprising a vertically elongated pressure vessel of circular cross-section enclosing a reaction chamber at one end and a gas cooling chamber in its remaining portion, means for carrying out a high temperature synthesis gas reaction in said reaction chamber at a superatmospheric pressure therein, vertically extending fluid heating tubes in said gas cooling chamber arranged to receive heat from the gas leaving said reaction chamber, a cylindrical metal liner in and extending substantially throughout the height of said reaction chamber, means for holding said liner in spaced relation to the circumferential wall of said pressure vessel to define therebetween a cooling fluid jacket surrounding said reaction chamber, means for supplying a vaporizable liquid to said cooling fluid jacket, and means for mixing vapor generated in said cooling fluid jacket with the synthesis gas generated in and discharged from said reaction chamber and providing a pressure equalizing vapor conduit connection between said cooling fluid jacket and a point in the synthesis gas flow path beyond said reaction chamber.

5. Synthesis gas apparatus comprising a vertically elongated pressure vessel of circular cross-section enclosing a reaction chamber at one end and a gas cooling chamber in its remaining portion, means for carrying out a high temperature synthesis gas reaction in said reaction chamber at a superatmospheric pressure therein, vertically extending fluid heating tubes in said gas cooling chamber arranged to receive heat from the gas leaving said reaction chamber, a cylindrical corrugated metal liner in and extending substantially throughout the height of said reaction chamber, means for holding said liner at a multiplicity of points in spaced relation to the circumferential wall of said pressure vessel to define therebetween a cooling fluid jacket surrounding said reaction chamber, means for supplying a vaporizable liquid to said cooling fluid jacket, and means for mixing vapor generated in said cooling fluid jacket with the synthesis gas generated in and discharged from said reaction chamber and providing a pressure equalizing vapor conduit connection between said cooling fluid jacket and a point in the synthesis gas flow path beyond said reaction chamber.

6. Synthesis gas apparatus comprising a vertically elongated pressure vessel of circular cross-section enclosing a reaction chamber in its lower end and a gas cooling chamber in its superjacent remaining portion, means of carrying out a high temperature synthesis gas reaction in said reaction chamber at a superatmospheric pressure therein, vertically extending fluid heating tubes in said gas cooling chamber arranged to receive heat from the gas leaving said reaction chamber, a cylindrical corrugated metal liner in and extending substantially throughout the height of said reaction chamber, means for holding said liner at a multiplicity of points in spaced relation to the circumferential wall of said pressure vessel to define therebetween a cooling fluid jacket surrounding said reaction chamber, a layer of refractory material at the inner side of said liner receiving radiant heat from said reaction chamber, means for supplying a vaporizable liquid to said cooling fluid jacket, and means for mixing vapor generated in said cooling fluid jacket with the synthesis gas generated in and discharged from said reaction chamber and providing a pressure equalizing vapor conduit connection between said cooling fluid jacket and a point in the synthesis gas flow path beyond said reaction chamber.

References Cited in the file of this patent

UNITED STATES PATENTS

| | | |
|---|---|---|
| 1,722,496 | Chapman | July 30, 1929 |
| 2,420,935 | D'Aquin | May 20, 1947 |
| 2,594,329 | Mayhew | Apr. 29, 1952 |
| 2,594,330 | Mayhew | Apr. 29, 1952 |
| 2,601,001 | Patterson | June 17, 1952 |
| 2,603,559 | Patterson | July 15, 1952 |
| 2,632,427 | Mercier | Mar. 24, 1953 |
| 2,660,235 | Patterson | Nov. 24, 1953 |
| 2,672,849 | Fruit | Mar. 23, 1954 |
| 2,683,654 | Bergman | July 13, 1954 |